3,639,650
MANUFACTURE OF MALEYL-FATTY ACID
ADDUCT
Lowell O. Cummings, San Anselmo, Calif., assignor to
Pacific Vegetable Oil Corporation, San Francisco, Calif.
No Drawing. Filed Mar. 28, 1969, Ser. No. 811,609
Int. Cl. C09f 7/00
U.S. Cl. 260—18 R          10 Claims

ABSTRACT OF THE DISCLOSURE

An adduct of an unsaturated unconjugated fatty acid or an ester thereof, such as a glyceride oil, and a maleyl compound is produced by reacting these components at a temperature between 300° F. and 350° F. in the presence of sulfur dioxide. This adduct is lower in viscosity, lighter in color and of higher acidity than prior-art adducts of such components, and therefore gives better results in coatings.

---

This invention relates to an improved oil-maleic adduct and to a process for its production.

Previously known adducts of a maleyl compound and an unsaturated, nonconjugated fatty acid or an ester thereof have been produced by either (1) reaction at a temperature of from 150 C. to 300 C. (302 F. to 572 F.) under normal pressure, or in an autoclave, and with maintenance of such temperatures for several hours, or (2) reaction for about 7 hours at a temperature of from 220 C. to 225 C. (428 F. to 437 F.) under an inert gas, such as nitrogen or carbon dioxide, the latter process giving an adduct of improved, somewhat lighter color. Such adducts can be incorporated as modifiers in paints and enamels to improve brushing, leveling, and flow characteristics, as intermediates in forming resins which can be used as binders in fibrous masses, or alone, or in admixture with other components as a vehicle for top coatings or finishing coatings.

However, these prior-art processes, especially as applied to polyunsaturated, naturally occurring, glyceride or fatty oils, gave adducts that were relatively highly colored, i.e., yellowish-brown. This high color reduced their usefulness as additives in colorless or light-colored paints, coatings, or resinous binders. The adducts also were rather viscous, and this also reduced their usefulness as coating materials or components. Furthermore, it was well recognized that the acid values of the products were reduced, indicating undesired and unnecessary cross-linking in the final adduct; and this also had the effect of reducing reaction potentiality of such adducts where it would be desired to react them further with another component or to polymerize in a particular milieu.

Thus, it has long been desired to obtain an oil-maleyl adduct of lighter color, relatively low viscosity and of higher acid value than such adducts obtained by prior-art methods. Adducts of this type having such desirable properties are obtained by the process of the present invention. The process of the present invention and the products obtained thereby exhibit other advantages and utilities as will become apparent from the description below.

This invention provides an adduct of a maleyl compound and an unsaturated unconjugated fatty acid or an ester thereof, e.g., with an alcohol as in a fatty or glyceride oil, or with a resin. It's a process comprising heating an admixture of such reactants at a temperature of not over 350 F. (177 C.), preferably between 300 and 350 F. in the presence of sulfur dioxide as a catalyst.

The glyceride oils useful in the present invention include safflower oil, refined soy oil, nonbreak soy oil, sunflower oil, linseed oil, and marine oils, e.g., alkali-refined fish oil. There can alternatively be used tall oil fatty acids, unsaturated unconjugated fatty acids from any source, or alkyl esters of such fatty acids, e.g., methyl esters. Resin esters are also useful, such as, for instance, the ester of an unsaturated unconjugated fatty acid with an epoxy resin, or with a styrene-allylalcohol copolymer, with an alkyd resin made from phthalic acid and a polyalcohol, or other compound having such available fatty acid group. The unsaturated unconjugated fatty acid used herein is any such acid having at least 10 carbon atoms in the chain, and suitably from 10 to 26 such carbon atoms.

Safflower oil is an especially advantageous reactant herein, in part because it normally has a higher content of linoleic acid, i.e., from 73% to 78% thereof based on total fatty acid weight, and also because it has the advantage of being substantially free of factors tending to cause yellowing in paint formulations in which it is later included. A high-oleic safflower oil containing about 80% oleic acid, based on total fatty acid content is also useful, as are the methyl esters of the fatty acids of safflower oil. Compatible mixtures of such components can also be used.

The maleyl compound is preferably maleic anhydride,

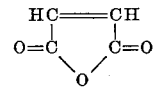

Other maleyl compounds are useful herein, such as maleic acid,

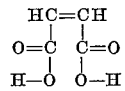

which changes to maleic anhydride when heated to about 130 C. (266 F.), or itaconic acid, also called methylene succinic acid

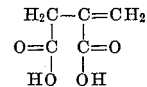

Since maleic anhydride is readily available and is relatively inexpensive, the invention will be described with reference to this compound. Preferably, the starting mixture incorporates a substantially stoichiometric amount of the anhydride with respect to the amount of unsaturation of the oil or acid or ester to be reacted, but more or less can be employed if desired. In general, there is admixed from about 10% to about 35% by weight, based on the total weight of the two reactants, of the maleyl compound, expressed as maleic anhydride, though a range of 1% to 40% is practical.

The catalyst employed herein is sulfur dioxide, and it is added as the free compound and in gaseous form, suitably by bubbling or passing a stream of the gas through the liquid reaction mixture. The reaction goes very well without mechanical stirring but only the turbulence produced by the bubbling of the gas; however, generally it is preferred to employ mechanical stirring in order to speed the mixing and hence the reaction. A relatively small or catalytic amount of sulfur dioxide is employed in this process, sufficient to effect the desired reaction between the fatty acid or ester and the maleyl compound such as at a rate of from about 0.01 to about 2.5 cubic feet per hour per gallon of such admixture. Very good results are obtained by passing the sulfur dioxide gas through the reaction mixture at a rate of from about 0.01 to about 1.5 cubic feet per hour per gallon of fatty acid ester. The rate is affected somewhat by the size of the batch. The reaction time can be from 3 to about 5 hours, being carried on until the maleyl compound is nearly completely reacted and the unreacted maleyl compound can be distilled off.

In carrying out the process of this invention, the fatty-acid containing reactant and the maleic anhydride are admixed in the desired amounts, and the mixture is heated in the absence of oxygen, suitably while being stirred and under an inert gas such as nitrogen, to a temperature of about 300 F. (149 C.) and then $SO_2$ gas is introduced, passing it through the heated and liquefied mixture. The temperature is then maintained at from about 300 F. to not over 350 F. (177 C.) until substantially all of the maleic anhydride is reacted, as determined by removing a reaction sample and testing it for free maleic anhydride. This may be done by extracting the sample with water, and titrating the water extract with aqueous sodium hydroxide solution. At the conclusion of the reaction period, the flow of sulfur dioxide is stopped, and nitrogen gas is blown through the reaction product at a fast rate to drive off any unreacted maleic anhydride and any other undesired volatilizable material which may be present.

The products obtained by the present invention exhibit lighter color than such adducts made by the prior-art methods, the color in general not exceeding 10, and in most instances not exceeding 7, on the Gardner scale.

Another important advantage of the present product is that its viscosity is low relative to products produced from the same percentage of maleic anhydride by other processes, with more complete reaction of the maleic anhydride, indicating that in the present process side reactions such as production of ketones, cross-linking of the fatty chains, and reduction of the acidity of the maleic anhydride are substantially avoided. The viscosity of the reaction product varies, of course, with the percent of maleic anhydride used, giving up with increasing percentages of the maleyl compound. As will be seen from the specific examples below, these viscosities for each percentage are less than under prior-art processes of which I am aware. The increased acidity of the products produced herein is a further advantage.

The products of this invention, being of lower viscosity, lighter color, and higher acidity, have great versatility of use. They can be used as additives in paints, coatings, and resins, as mentioned above. The adduct of safflower oil and maleic anhydride, in particular, is a free flowing, light-colored oil, which, when made into a water solution by using ammonium hydroxide or an amine, water, and, preferably, a coupling agent such as propylene glycol, acts as a wetting agent and a vehicle in latex paints; and when added, for instance, in an amount of about 10% of the vehicle, contributes great smoothness in brushing and improved leveling with avoidance of pinholes, and with less foaming in the can. These products also provided improved removal of spots and stains from surfaces painted with paints containing them.

The adducts herein form salts with ammonium hydroxide or an amine. The ammonium salts are water soluble, and in water solution are useful in formulating paints or coatings which can be electroplated or electrodeposited onto metal surfaces, by an electrical current which deposits charged particles or ions of the vehicle onto metal, forming a firm continuous coating on the metal. The products of this invention can be air-dried or baked with incorporation of metallic driers as known in the paint art. The adducts can also be copolymerized with styrene, acrylate, or methacrylate polymers, or with admixtures of these, and the resulting copolymer can be reacted with an amine or coupling agent to form a water soluble product useful as a paint vehicle.

The following specific examples illustrate modes of carrying out the invention.

EXAMPLE 1

The benefits of the invention are demonstrated by a comparison of the properties of an adduct of safflower oil and maleic anhydride made by a prior-art process and an adduct made from the same starting materials but according to the present invention.

According to the invention, an admixture was prepared of 2550 grams safflower oil and 450 grams of maleic anhydride (85 parts and 15 parts, respectively, by weight) and was placed in a four-liter glass flask fitted with a stirrer, thermometer, and a gas inlet tube having its lower opening below the stirrer blades. The mixture was heated and stirred under a blanket of nitrogen until the temperature reached 300 F. (149 C.), and then sulfur dioxide gas was blown through the mixture at a rate of about one cubic foot per hour. During the course of the reaction, samples were removed and tested for content of free maleic anhydride by shaking 10.00 grams of reaction product in 30.00 grams water in a separatory funnel, allowing the layers to separate, taking an aliquot of the water layer and titrating it with aqueous sodium hydroxide solution to determine the amount of free maleic anhydride still present. At the end of 2.5 hours reaction time, the free maleic anhydride content was 53% of that charged and at the end of 4 hours, it was about 2%. At this time the $SO_2$ was discontinued and nitrogen was blown through the reaction product at a fast rate to drive off any unreacted maleic anhydride. In Table I below, this product of the invention is designated Adduct A.

Another starting batch was made up in exactly the same manner and charged into the same apparatus, but the charge was heated to form 428 F. to 437 F. (220 C.–225 C.) and held at such temperature for 7 hours, according to standard prior-art procedure. A small stream of nitrogen was blown through the reaction mixture at all times to exclude air. At the end of 7 hours, the resin product was cooled and tested, all as taught in the prior art. This prior-art product is designated Adduct B in Table I below.

The comparative properties of the adducts formed as described above are set out in Table I below, Adduct A having been made by the method of the invention and Adduct B, by a prior-art method.

TABLE I

| Adduct | Yield, percent by wt. | Color-Gardner | Acid value [1] | Viscosity stoke (25 C.) | Yield of acidity,[2] percent |
|---|---|---|---|---|---|
| A | 97.0 | 3 | 130 | 7.4 | 92 |
| B | 99.6 | 11 | 91 | 25.5 | 53 |

[1] In this specification and claims, the acid number is determined after boiling a sample in pyridine-water mixture for 10 minutes to break up anhydrides to acid groups.
[2] Acidity yield is based on the theoretical acidity of the amount of maleic anhydride weight in the resin product, compared to the actual acidity found in the resin.

It can be seen that the color and viscosity, as well as acid value and yield of acidity, are greatly, even markedly, improved in the product made according to the invention.

EXAMPLE 2

Twenty-four hundred grams of nonbreak soy oil and 600 grams of maleic anhydride (80 to 20 in parts by weight) were charged to the same reactor as shown in Example 1. There, they were heated and stirred under a blanket of nitrogen to a temperature of about 300 F. and then sulfur dioxide was blown into the mixture at a rate of about 1 cubic foot per hour. The temperature was maintained at from 330 F. to 345 F. for five hours and then the $SO_2$ stream was shut off, and a fast stream of nitrogen was blown through the oil to remove unreacted maleic anhydride. The product, made according to this invention, is termed Adduct C in Table II below.

The procedure was then repeated, except that no $SO_2$ was introduced, but nitrogen gas flow was substituted therefor. The time was again five hours at 330 to 345 F. The product is the Adduct D of Table II below and is the product of the prior-art process.

The properties of each adduct are shown in Table II below:

TABLE II

| Adduct | Yield, percent by wt. | Color-Gardner | Acid value | Viscosity stokes (25 C.) | Yield of acidity | Percent by wt. mal. anh. reacted |
|---|---|---|---|---|---|---|
| C | 97.7 | 5 | 190 | 109 | 92.4 | 90 |
| D | 94.9 | 9 | 158 | 4.8 | 87.0 | 79 |

EXAMPLE 3

Refined soy oil was reacted with maleic anhydride in (E) with addition of $SO_2$ and in (F) without $SO_2$ but under nitrogen gas as in the prior art. To make Adduct E of Table III below, an adduct of this invention, 1768 grams or 75% by weight of a batch of soy oil and 588 grams of maleic anhydride (25% by weight) were placed in a suitable receptacle and heated together to 150 C., with stirring under a nitrogen blanket. Then $SO_2$ was bubbled through the oil mass at a rate of 0.5 cubic feet per hour, at a temperature of 170 C. (338 F.) for 4.5 hours, at the end of which time the $SO_2$ stream was stopped, nitrogen was blown hard through the mass and the mass was then cooled to room temperature.

To make Adduct F of Table III below, a prior-art adduct, 1768 grams of the same oil were heated under a nitrogen blanket to 230 C. (446 F.). Then 588 grams melted maleic anhydride were added over a period of 1.5 hours and the mass heated at 250 C. (482 F.) for 15 minutes and then cooled, also to room temperature.

The properties of these two products and their comparison are shown in Table II, below, following Example 12, along with comparative data on products prepared according to the examples which follow.

EXAMPLE 4

2000 grams, or 67% by weight of the methyl esters of the fatty acids of safflower oil and 1000 grams of maleic anhydride, or 33% thereof, were reacted in the same procedure as shown in Example 3 (E), to give Adduct G, an adduct of this invention, described in Table III.

EXAMPLE 5

Sunflower oil having an iodine value of 139 and a Gardner color of 5, was reacted with maleic anhydride in the same procedure as in Example 3 (E). There were employed 560 grams, or 80% by weight of the oil and 140 grams, or 20% by weight, of the anhydride. The result is Adduct H, an adduct of this invention, described in Table III.

EXAMPLE 6

600 grams, or 75% by weight of a high-oleic grade of safflower oil were admixed with 200 grams, or 25% by weight of maleic anhydride. The oil contained 80% oleic acid, 13% linoleic acid, 1% stearic acid and 6% palmitic acid, based on total weight of fatty acids, and had an iodine value of 90. The reaction mixture was heated to 340 F. (171 C.) under nitrogen, and then $SO_2$ was blown through the mass at a rate of 1 cubic foot per hour for 10 hours. The reaction mixture was then blown with a fast stream of nitrogen to remove excess maleic anhydride. The result is Adduct I of Table III.

EXAMPLE 7

1321 grams, or 88% by weight, of an alkali-refined linseed oil and 179 grams, or 12% by weight, of maleic anhydride were heated to 300 F. (149 C.) under nitrogen, then $SO_2$ was bubbled through at 0.3 cubic feet per hour until the temperature reached 340 F. (171 C.), and the mass was held at this temperature, while flow of $SO_2$ continued for 4.5 hours. Then $SO_2$ flow was stopped and the mass was blown hard with nitrogen and then cooled to room temperature. The result is Adduct J as described in Table III.

EXAMPLE 8

2400 grams of tall oil fatty acids having a rosin content of less than 2% by weight (Acintol FA#2, sold by Arizona Chemical Company) were mixed with 600 grams, or 20% by weight based on the total weight of the mix, or maleic anhydride, and the whole was heated to 340 F. (171 C.) under nitrogen and thereafter $SO_2$ is blown through the mass, while maintaining this temperature, for about four hours at a rate of one cubic foot per hour. Then the flow of $SO_2$ was stopped and nitrogen blown through to remove excess maleic anhydride. The result was Adduct K of Table III.

EXAMPLE 9

700 grams of alkali-refined fish oil, or 85% by weight, were admixed with 124 grams, or 15% by weight, of maleic anhydride. The fish oil has an iodine value of 187, an acid value of 0.2, and color (Gardner) of 8. The mixture was heated and processed exactly as in Example 7, except that sulfur dioxide was blown in for only 3 hours at a rate of 0.3 cubic foot per hour. The result was Adduct L of Table III.

EXAMPLE 10

For Adduct M of Table III, 2700 grams of bleached refined safflower oil (90% by weight) were admixed with 300 grams (10% by weight) of maleic anhydride and heated under nitrogen atmosphere to 340 F. (171 C.). Then $SO_2$ gas was blown through the mass at this temperature, at 1 cubic foot per hour, for 4 hours. The flow of $SO_2$ was then stopped, and a fast stream of nitrogen blown through to remove unreacted maleic anhydride.

For Adduct N, the procedure for Adduct M was repeated, but using 2400 grams of the safflower oil and 600 grams of maleic anhydride.

For Adduct O, the procedure for Adduct M was repeated, but using 2250 grams of the safflower oil and 750 grams maleic anhydride.

For Adduct P, the procedure for Adduct M was repeated but using 2100 grams of the same oil and 900 grams maleic anhydride.

Thus, there were employed in these four tests, (M) 90% and 10%, (N) 80% and 20%, (O) 75% and 25%, and (P) 70% and 30% of the two reactants, respectively, by weight. Note that Example I gives the proportions, 85% and 15%.

EXAMPLE 11

As the fatty acid reactant, an ester made from epoxy resin, diglycydyl ether of bisphenol A known as Araldite 7072 and sold by CIBA Products Co., of Summit, N.J. (in the amount of 956 grams) was reacted with tall oil fatty acids (2060 grams) to give a resin having an acid value of 38, Gardner color of 5, and a viscosity of $Z_5$ Gardner, or 92 stokes. There were then admixed 700 grams, or 93.1% by weight of this resin, and 52 grams, or 6.9% by weight, of maleic anhydride, and the whole was heated to 340 F. (171 C.) at which time $SO_2$ gas was introduced at a rate of 0.2 cubic foot per hour for four hours. The mass was then hard blown with nitrogen. The result was Adduct Q of Table III.

EXAMPLE 12

There was employed in this example an ester made by admixing 400 grams of a methyl ester of safflower oil, 400 grams allylalcohol-styrene resin (sold by Shell Chemical Co., under the trademark, Resinous Polyol X–330 which is the resinous copolymer of styrene and allylalcohol) and a lithium soap catalyst, and heating the mix to 500 F. in 3 hours, to give a product having a viscosity of 295 stokes and a Gardner color of 5. There were admixed 450 grams (89.5% by weight), of this ester and 53 grams (10.5% by weight), of maleic anhydride. The mix was then heated to 300 F. (149 C.) and $SO_2$ gas introduced at a rate of 0.2 cubic foot per hour. The temperature was increased to 330° F. (about 166 C.) and held for one hour while continuing flow of $SO_2$, after which the $SO_2$ flow was stopped and the mass hard blown with nitrogen. The result was Adduct R of Table III.

TABLE III

| Example | Adduct | Yield, wt. percent | Color-Gardner | Acid No. | Viscosity, stokes (20 C.) | Yield of acidity, wt. percent | Wt. percent free maleic anhydride in product |
|---|---|---|---|---|---|---|---|
| 3 | E | 93 | 6 | 225 | 488 | 88 | 0.38 |
|   | F [1] | 93 | 18 | 200 | 4,043 | 78 | 0.16 |
| 4 | G | 98 | 7 | 325 | 25 | 91.5 |  |
| 5 | H | 97.5 | 5+ | 178 | 480 |  | 0.22 |
| 6 | I | 93 | 10+ | 196 | 13 | 89 | 1.1 |
| 7 | J | 99 | 4 | 105 | 13.5 |  |  |
| 8 | K |  | 9 | 308 | (2) |  |  |
| 9 | L | 98.5 | 5+ | 135 | 3 1300 |  |  |
|   | M | 99.4 | 4+ | 85 | 5.7 | 80 | 1 |
| 10 | N | 98.5 | 4 | 190 | 57 | 88 | 1 |
|   | O | 97.5 | 4+ | 235 | 106 | 90 | 1 |
|   | P | 96.8 | 6+ | 273 | 1,240 | 86.5 | 1 |
| 11 | Q | 97.3 | 7 | 66 | 820 |  | 0.0 |
| 12 | R | 96 | 6 |  | (4) |  | 0.0 |

[1] This adduct F was made by a prior-art process. All the other adducts of this table were made by the present invention.
2 Crystalline.
3 Partially crystalline.
4 Semi-solid.

Of the above products, it is to be noted that Adduct G of Example 4 shows that the methyl esters add on well; that sunflower oil yielded a very clear product (Adduct H); in Example 8, the products of Adduct K comprise crystals suspended in a very low viscosity fluid; and in Example 9 (Adduct L), there was a very small amount of crystals in the product.

In this specification and claims, parts and percentages are by weight, unless otherwise indicated. Viscosity is expressed in stokes, as determined. The iodine number is determined by the well-known Wijs method. The term "soy" oil is also intended to mean the oil sometimes known as "soya" or "soybean" oil.

Instead of blowing with nitrogen gas as shown in the above examples to remove unreacted maleyl compound which may remain, other means of removal thereof may be practiced. or instance, another inert gas can be used for blowing, such as carbon dioxide; and alternatively, the mass can be heated under vacuum to distill selectively any unreacted maleyl compound. The reaction is continued until substantial completion and this point is suitably determined by taking a sample of the reaction mixture and determining in a series of a few tests successively, that the amount of maleyl compound or starting component has become a very minor amount, such as one or two percent. Substantially all of the maleyl compound reacts readily with the oil or resin in about five hours at 350 F. or under with sulfur dioxide. This is true even when 33% maleyl compound is used with 67% resin or oil. There is no strict stoichiometric amount in this reaction, the limit being a practical one determined by increases in both viscosity and acidity. About 40% maleyl compound is the practical upper limit.

By the term "maleyl compound" is meant the starting maleyl compound as defined hereinabove.

Having now described the invention, what is claimed is:

1. The process for producing an adduct of a maleyl compound and an unsaturated, unconjugated fatty acid or an ester thereof, comprising:
   (a) admixing an unsaturated, unconjugated fatty acid having at least 10 carbon atoms in the chain, an ester thereof, an unsaturated vegetable oil, or a marine oil, and
   (b) from 1% to 40% by weight, based on total weight of the admixture, of a maleyl compound chosen from the group consisting of maleic acid, maleic anhydride, and itaconic acid,
   (c) heating the resulting admixture to a temperature of from 300 F. to not over 350 F.,
   (d) in the presence of sufficient sulfur dioxide to catalyze reaction between said fatty acid or said ester and said maleyl compound, said sulfur dioxide being added in an amount of from about 0.01 to 2.5 cubic feet per hour per gallon of said admixture, and
   (e) continuing said heating until said admixture contains only about two percent or less of unreacted said maleyl compound.

2. The process as in claim 1 wherein there is employed a glyceride oil of said fatty acid.

3. The process as in claim 1 wherein said ester is a methyl ester.

4. The process as in claim 2 wherein said oil is safflower oil.

5. The process as in claim 2 wherein said oil is a vegetable drying oil.

6. The process as in claim 2 wherein said oil is a marine oil.

7. The process as in claim 1 wherein there is employed a resin ester of said unsaturated unconjugated fatty acid.

8. The process as in claim 1 wherein said maleyl compound is maleic anhydride.

9. The process as in claim 1 wherein said $SO_2$ is added at a rate of from about 0.01 to about 2.5 cubic feet per hour per gallon of said admixture for from about three to about eight hours.

10. The process for producing an adduct of a maleyl compound and a fatty component, comprising:
   (a) admixing as fatty component an unsaturated unconjugated fatty acid ester having from 10 to 26 carbon atoms in the carbon chain and
   (b) maleic anhydride,
   (c) said fatty component and said maleic anhydride being present in amounts of up to 40% of said admixture,
   (d) heating said admixture to a temperature of from about 300 F. to less than 350 F.
   (e) introducing sulfur dioxide gas into said admixture at a rate of from about 0.01 to about 2.5 cubic feet per hour per gallon of said admixture to catalyze reaction between said fatty component and said maleic anhydride, and
(f) continuing said heating and said gas introduction until substantially no free maleic anhydride remains in said admixture, and
(g) separately recovering said adduct.

References Cited

UNITED STATES PATENTS

| | | | |
|---|---|---|---|
| 2,306,281 | 12/1942 | Rust | 260—341 |
| 2,374,381 | 4/1945 | Root | 260—342.4 |
| 2,839,550 | 6/1958 | Wiggerink et al. | 260—404.8 |
| 3,253,938 | 5/1966 | Hunt | 106—252 |

FOREIGN PATENTS 647,352  12/1950  Great Britain.

OTHER REFERENCES

"Varnish Constituents," by H. W. Chatfield p. 16.

DONALD E. CZAJA, Primary Examiner

E. C. RZUCIDLO, Assistant Examiner

U.S. Cl. X.R.

117—167; 204—181; 260—18 EP, 22 T, 23 AR, 404.8